Aug. 14, 1945.　　　L. M. HOLTZ　　　2,381,956
WORK SUPPORT FOR LATHES
Filed Aug. 30, 1944　　　2 Sheets-Sheet 1
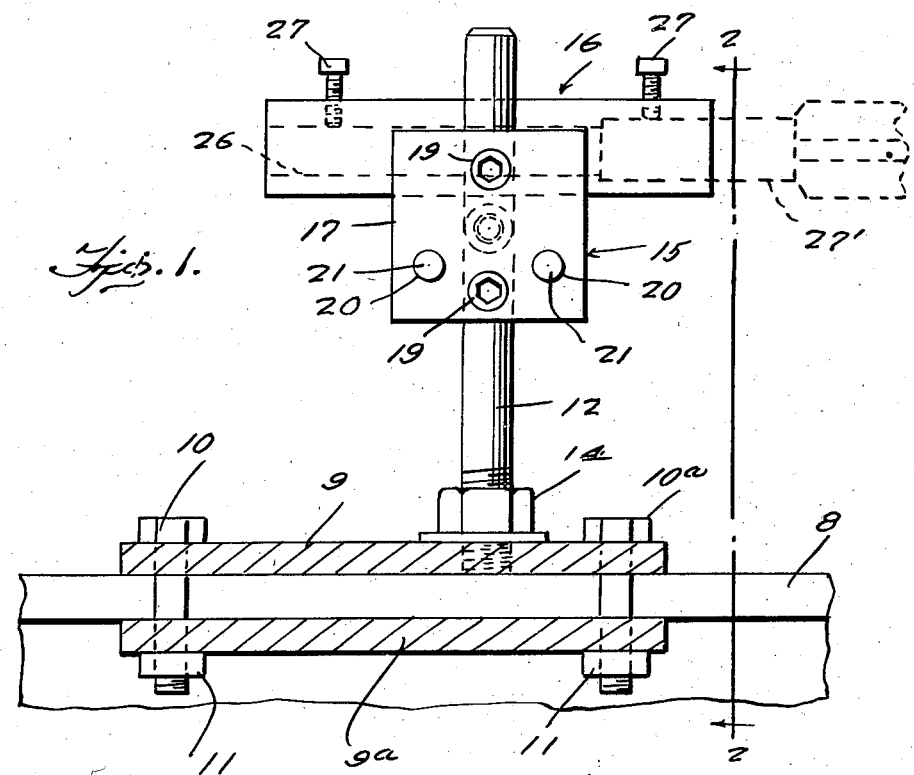
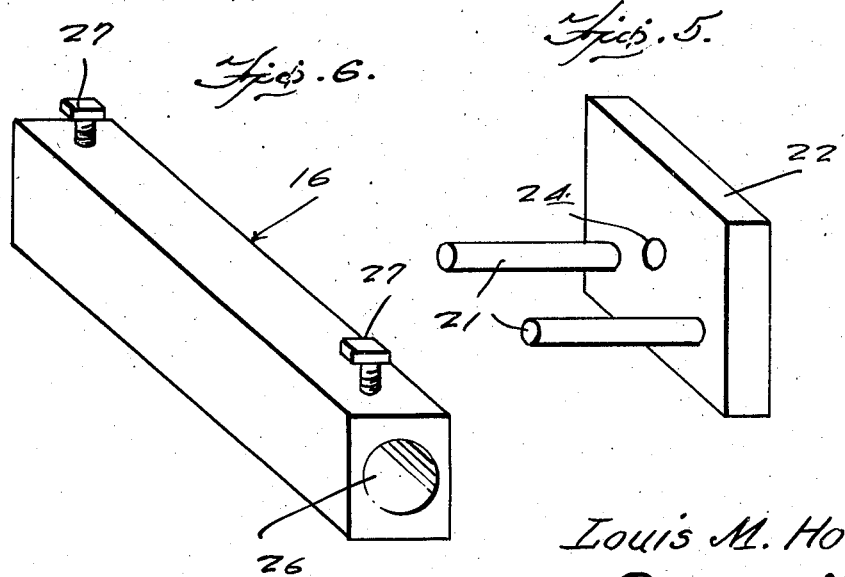
Inventor
Louis M. Holtz
By Clarence A. O'Brien
and Harvey B. Jacobson
Attorneys

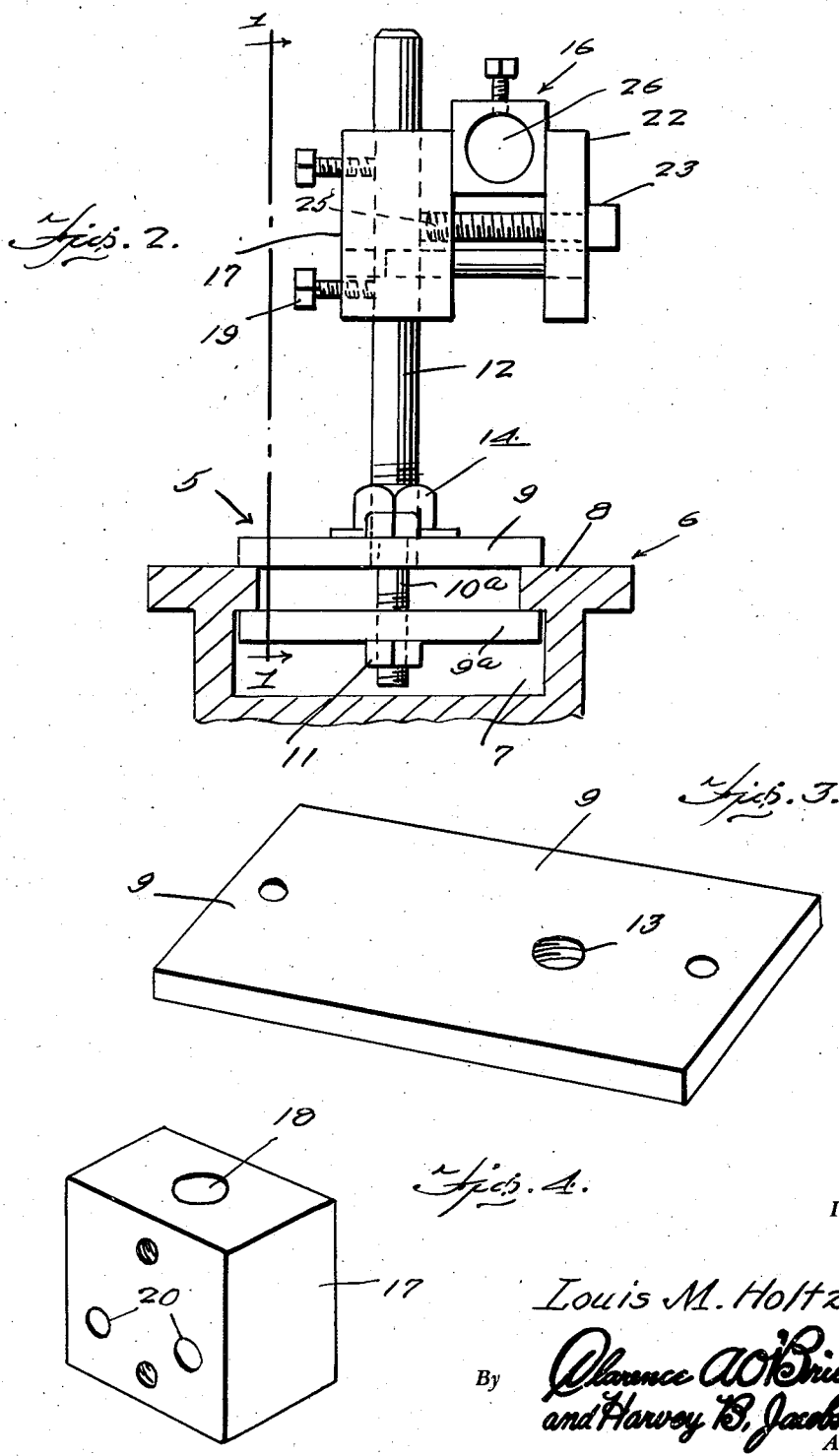

Patented Aug. 14, 1945

2,381,956

UNITED STATES PATENT OFFICE 2,381,956

WORK SUPPORT FOR LATHES

Louis M. Holtz, Chicago, Ill.

Application August 30, 1944, Serial No. 551,866

3 Claims. (Cl. 51—218)

This invention relates to a work support for lathes, and has more particular reference to such a support primarily designed for holding a tap in position to be operated upon by a grinder mounted upon the tool carriage of the lathe, and while reconditioning the tap.

The primary object of the present invention is to provide a work support of the above kind which is comparatively simple and durable in construction, highly efficient in use, and otherwise well adapted to meet with the requirements for a successful commercial use.

Specific objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a fragmentary view partly in side elevation in vertical section on the plane of line 1—1 of Figure 2, showing a work support constructed in accordance with the present invention and operatively mounted upon the bed of a lathe.

Figure 2 is a vertical transverse section taken substantially on the plane of line 2—2 of Figure 1.

Figure 3 is a perspective view of one of the plates of the base clamp forming part of the work support shown in Figures 1 and 2.

Figure 4 is a perspective view of the vertically adjustable block forming one of the jaws of the tap holder clamp constituting part of the work support shown in Figures 1 and 2.

Figure 5 is a perspective view of the movable jaw plate and its guide pins, forming part of the tap holder clamp.

Figure 6 is a perspective view of the tap holder.

Referring in detail to the drawings, the present work support includes a lathe vise which embodies a base clamp 5 for mounting the support upon the bed 6 of the lathe. The bed 6 has a guideway 7 and side flanges 8 along the top of said guideway. The ordinary tool carriage of the lathe is mounted for movement in the guideway 7 longitudinally of the bed 6 in a well known manner.

The base clamp 5 includes a pair of spaced similar horizontal clamping plates 9 and 9a adapted to span the guideway 7 directly above and below the flanges 8, respectively. These clamping plates 9 and 9a are of a width to engage the upper and lower surfaces of the flanges 8 at their longitudinal edge portions. Passing through the corresponding opposite ends of the clamping plates 9 and 9a intermediate the sides of the latter are clamping bolts 10 and 10a having nuts 11 threaded thereon for drawing the plates 9 and 9a together and into tight clamping engagement with the flanges 8. In this way, the vise is securely mounted in a fixed position at the desired point along the guideway 7 of the lathe bed. Rigid with and rising from the upper clamping plate 9 of the base clamp is a post 12 whose lower end is threaded in an opening 13 of said clamping plate 9. The post 12 is prevented from accidentally threading out of the opening 13 by means of a jamb nut 14 threaded on post 12 and impinging the upper surface of plate 9.

The lathe vise further includes a clamp 15 for a tap holder 16, which clamp 15 includes a block 17 provided with a vertical opening 18 to be snugly slidably received on the post 12. Set screws 19 are provided in one side of the block 17 and arranged to impinge the post 12 to secure the block 17 in any desired vertically adjusted position relative to post 12. Also, the block 17 forms the stationary jaw of the clamp 15 and is provided with transverse openings 20 for slidable reception of lateral guide pins 21 fixed to and projecting from the movable jaw plate 22 of the clamp 15. The movable jaw plate 22 is vertically disposed at the side of block 17 opposite that which carries the set screws 19, and a clamping screw 23 freely passes through an opening 24 in jaw plate 22 and is threaded into an opening in the adjacent side of the block 17, as at 25. In practice, the tap holder 16 is disposed between the upper portions of block 17 and clamp plate 22, whereupon the screw 23 is rotated to draw the clamp plate 22 toward block 17 and thereby firmly clamp the tap holder 16 in place. Slight loosening of screw 23 is all that is necessary to permit removal of the tap holder 16.

Tap holder 16 consists of an elongated bar of rectangular cross section provided with an axial cylindrical bore 26 adapted for snug reception of the shank 27 of the tap to be supported. The bore 26 may be larger at one end of the holder 16 than at the other for accommodating the shanks of taps of different sizes, and a set screw 27 is provided at each end of the tap holder 16 adapted to impinge the shank 27 of the tap inserted in either end of the holder 16 to secure said shank in said holder. In practice, the tap holder 16 is horizontally disposed so as to project beyond the tap holder clamp toward the lathe carriage, whereby the tap will be supported horizontally in proper position to be operated upon by a grinder mounted upon the lathe carriage, as disclosed in my above-mentioned copending application.

From the foregoing description, it is believed that the construction and operation, as well as the advantages, of the present invention, will be readily understood and appreciated by those skilled in the art. It will be particularly seen that the present work support is of a comparatively simple and durable nature and composed of such simple parts that the same may be readily manufactured and easily taken apart or assembled. Also, the device may be quickly and easily mounted in position upon the bed of the lathe and will effectively support the work in position. By simply loosening the proper set screw 27, the tap may be turned to present a new face to the grinding element from time to time as desired. Minor changes may be made in details of construction illustrated and described, such as fairly fall within the spirit and scope of the invention as claimed.

What I claim is:

1. A work support for a lathe having a tool carriage guideway and inwardly projecting top flanges at the sides of said guideway, comprising a base clamp, a post rigid with and rising from said base clamp, and a tap holder clamp vertically adjustable on said post, said base clamp including a pair of substantially similar horizontal clamp plates respectively engageable along their opposite side edge portions with the upper and lower surfaces of the flanges at the sides of the lathe guideway, and clamping bolts passing through opposite ends of said clamp plates for drawing them toward each other into gripping engagement with said flanges, and a tap holder removably retained in said tap holder clamp and comprising an elongated bar of rectangular cross section having an axial bore for reception of the shank of a tap to be supported, and a set screw carried by said bar and arranged to impinge the tap holder shank to secure the same in said bore.

2. A work support for a lathe having a tool carriage guideway and inwardly projecting top flanges at the sides of said guideway, comprising a base clamp, a post rigid with and rising from said base clamp, a tap holder, and a tap holder clamp vertically adjustable on said post, said base clamp including a pair of substantially similar horizontal clamp plates respectively engageable along their opposite side edge portions with the upper and lower surfaces of the flanges at the sides of the lathe guideway, and clamping bolts passing through opposite ends of said clamp plates for drawing them toward each other into gripping engagement with said flanges, said tap holder clamp comprising a block vertically slidable on the post for vertical adjustment, means to releasably secure said block in vertically adjusted positions, a vertical adjustable clamp plate cooperating with said block to clamp the tap holder therebetween, and a clamp screw passing through said clamp plate and threaded into said block for drawing the clamp plate toward the latter and into gripping engagement with the tap holder.

3. A work support for a lathe having a tool carriage guideway and inwardly projecting top flanges at the sides of said guideway, comprising a base clamp, a post rigid with and rising from said base clamp, a tap holder, and a tap holder clamp vertically adjustable on said post, said base clamp including a pair of substantially similar horizontal clamp plates respectively engageable along their opposite side edge portions with the upper and lower surfaces of the flanges at the sides of the lathe guideway, and clamping bolts passing through opposite ends of said clamp plates for drawing them toward each other into gripping engagement with said flanges, said tap holder clamp comprising a block vertically slidable on the post for vertical adjustment, means to releasably secure said block in vertically adjusted positions, a vertical adjustable clamp plate cooperating with said block to clamp the tap holder therebetween, and a clamp screw passing through said clamp plate and threaded into said block for drawing the clamp plate toward the latter and into gripping engagement with the tap holder, and guide pins rigid with and projecting laterally from said clamp plate, and slidably extending through said block to cause rectilinear movement of the clamp plate toward the block when adjusted by said clamp screw.

LOUIS M. HOLTZ.